Dec. 24, 1957     O. E. BARSTOW     2,817,231
VISCOSIMETER Filed Oct. 1, 1953     5 Sheets—Sheet 1

INVENTOR.
Ormond E. Barstow
BY
Griswold & Burdick
ATTORNEYS

Dec. 24, 1957     O. E. BARSTOW     2,817,231
VISCOSIMETER
Filed Oct. 1, 1953     5 Sheets-Sheet 2

INVENTOR.
Ormond E. Barstow
BY
Griswold & Burdick
ATTORNEYS

Dec. 24, 1957     O. E. BARSTOW     2,817,231
VISCOSIMETER Filed Oct. 1, 1953     5 Sheets-Sheet 3

INVENTOR.
Ormond E. Barstow
BY

Griswold & Burdick
ATTORNEYS

Dec. 24, 1957

O. E. BARSTOW 2,817,231

VISCOSIMETER

Filed Oct. 1, 1953

INVENTOR.
Ormond E. Barstow
BY

Griswold & Burdick
ATTORNEYS

Dec. 24, 1957     O. E. EARSTOW     2,817,231
VISCOSIMETER Filed Oct. 1, 1953     5 Sheets-Sheet 5

INVENTOR.
Ormond E. Barstow
BY
Griswold & Burdick
ATTORNEYS

United States Patent Office 2,817,231
Patented Dec. 24, 1957

2,817,231

VISCOSIMETER

Ormond E. Barstow, Midland, Mich., assignor to The Dow Chemical Company, Midland, Mich., a corporation of Delaware Application October 1, 1953, Serial No. 383,673

10 Claims. (Cl. 73—60)

This invention relates to an improved apparatus for determining the viscosity of liquids.

An object of the invention is to provide a simple, rugged apparatus suitable for determining the viscosities of liquids over a wide range of values.

A further object is to provide an improved viscosimeter, free from significant frictional errors and having a linear calibration which may be computed.

Still another and important object of the invention is to provide an improved instrument for continuously measuring and recording the viscosity of liquids in closed systems which may be under pressure.

These and other objects and advantages are attained by the improved viscosity measuring instrument of the present invention in which a rotor rotates in a liquid and transmits torque to a stator by means of fluid-friction. A torque tube operatively connected to the stator is thereby caused to twist through an angle proportional to the transmitted torque. The torque tube serves as a calibrated spring to convert torque into an angular displacement which is proportional to the viscosity. In closed systems, a rigid spindle within the torque tube and operatively connected to the stator serves to transmit the angular displacement to a point outside the closed system where it can be measured.

Reference to the accompanying drawings will serve to explain more fully the improved apparatus of the invention. As therein shown.

Figure 1:
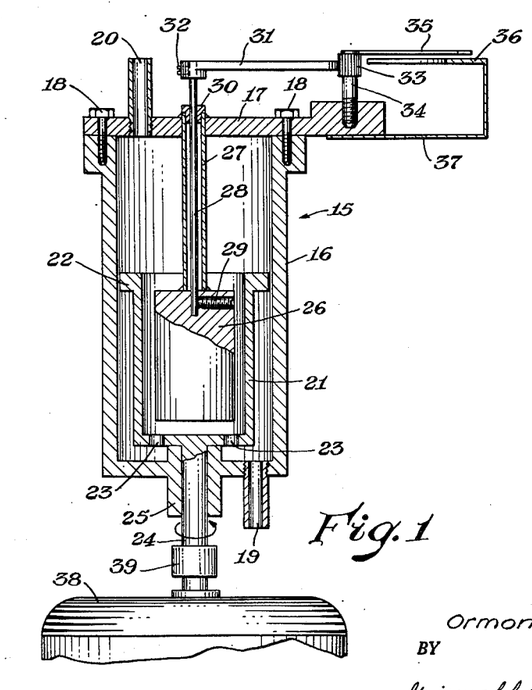
Fig. 1 is an elevational view mostly in section of a simple form of the improved viscosity measuring apparatus.
Figure 2:
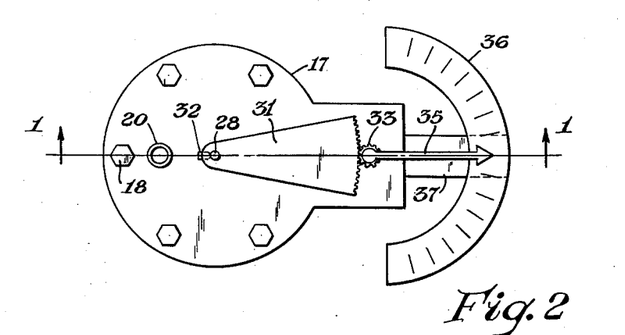
Fig. 2 is a top view of the viscometric apparatus illustrated in Fig. 1.

There is shown in Figs. 1 and 2, a viscosimeter 15 of metal construction having an elongated vertical cylindrical housing 16 and attached cover 17, said cover being secured to the housing by screws 18 to form a fluid-tight container. Opening into the bottom and near one side of the housing 16 is an inlet conduit 19. In the cover 17 near the side of the housing is an outlet conduit 20. Enclosed in the housing 16 and coaxial thereto is an open-topped cup-like rotor 21 having around its upper edge a horizontal flange 22 of diameter only very slightly less than that of the cylindrical wall of the housing. The bottom of the rotor cup 21 is perforated to provide a number of orifices 23. The rotor 21 is mounted at its base on a rotor shaft 24 which passes through a sleeve bearing 25 in the bottom of the housing 16. The rotor 21 is driven by a suitable motor 38 which is connected to the rotor shaft 24 by a coupling 39. Suspended coaxially within the cup-like rotor 21 is a cylindrical stator 26 of smaller diameter. Extending coaxially upward from the stator and rigidly attached and sealed thereto is a thin-walled torque tube 27, of known torque twist characteristics, the tube length being at least ten and preferably over twenty-five times its diameter. This torque-tube extends centrally through the housing cover 17, to which it is immovably connected and sealed. A torsionally rigid torque tube spindle 28, contained within the torque tube 27 in fluid-tight relation thereto, is held at its lower end to the stator 26 by a set screw 29, the threads of which are sealed with a suitable material. This spindle 28 extends coaxially through the torque tube 27 and through a spindle bearing 30 mounted on top of the torque tube to a point outside the housing. A sector gear 31 is mounted on the outer free end of the spindle 28 and held by a set screw 32. Engaging the sector gear 31 is a pinion gear 33 turning on a pivot 34. A pointer 35, attached to the pinion gear 33 for movement therewith, may be read against an arcuate scale 36 attached to the housing cover 17 by means of a bracket 37, thereby indicating in amplified form changes in angular position of the upper end of the spindle 28. If desired, a hair-spring (not shown) may be arranged to oppose the turning of the pointer 35, thus taking up any backlash in the assembly.

In operation, the viscosimeter 15 is filled with liquid, which may be changed constantly by supplying fresh liquid to the housing 16 through the inlet conduit 19. In progressing through the housing 16, a small part of the liquid may pass around the outside of the cup-like rotor 21 between it and the wall of the housing. However, due to the restricting flange 22 of the rotor 21, most of the liquid passes into the rotor at its base through the orifices 23. From there, liquid flows upwardly around the cylindrical stator 26 and on out the top of the housing 16 through the outlet conduit 20. Since the torque tube 27 is sealed at both of its ends, i. e. to the stator 26 and to the housing cover 17, liquid is prevented from entering the torque tube.

A suitable motor 38 turns the rotor 21 at a predetermined constant speed, imparting a shearing motion to the liquid between the rotor and the stator 26. This shearing motion produces a torque on the stator 26 causing the latter to turn slightly on its axis. The torque tube 27 is thereby twisted until the reaction torque in the twisted torque tube is just equal in magnitude to the torque applied to the stator 26 by the rotor 21. The displacement of the stator 26 and the resultant angular twist in the torque tube 27 are both proportional to viscosity and can therefore be used to determine the viscosity of the liquid. Since the torque tube spindle 28 is secured at its lower end to the stator 26, any turning movement of the stator is shared by the spindle 28. This spindle, held in the spindle bearing 30 apart from the wall of the torque tube 27, is free from frictional contact with the latter. The angular displacement of the outer end of the torque tube spindle 28 is measured relative to the housing 16, e. g. by means of the system shown consisting of a sector gear 31, pinion 33, pointer 35, and scale 36.

In measuring viscosity with the apparatus illustrated, the liquid to be measured is supplied at a known temperature. The indicator 35 is zeroed on the scale 36. Then the rotor 21 is turned at a constant and known speed, e. g. as determined by a tachometer, and the indicator reading is observed. From this reading, the dimensions of the parts, the torsional constants of the apparatus, and the rotor speed, the viscosity of the liquid may be calculated using the well-known force equations for viscous flow. Alternatively, and more conveniently, the apparatus may be calibrated using a liquid or a series of liquids of known viscosities.

With the foregoing principles in mind, the invention, in a preferred embodiment, may be described in detail with respect to Figs. 3 to 6, which illustrate a viscosimeter designed for continuously indicating the viscosity of a liquid flowing through a pipeline. As therein shown, the viscosimeter 15 is mounted firmly on top of a gear pump 40, which forwards liquid through the pipeline 41. A small portion of the pump discharge is usually passed upwardly as a sidestream through the viscosimeter 15 for continuous viscosity measurement. In the case of extremely viscous liquids, however, most or even all of the liquid entering the pump 40 may be made to pass through the viscosimeter 15. Power for turning the viscosimeter rotor 42 is derived from the gearing of the pump 40 by an extension shaft, viz. the viscosimeter drive shaft 43. This arrangement eliminates the need of a stuffing box or equivalent seal on the shaft 43 which drives the viscosimeter rotor 42.

Figures 3, 4, 5, 6:
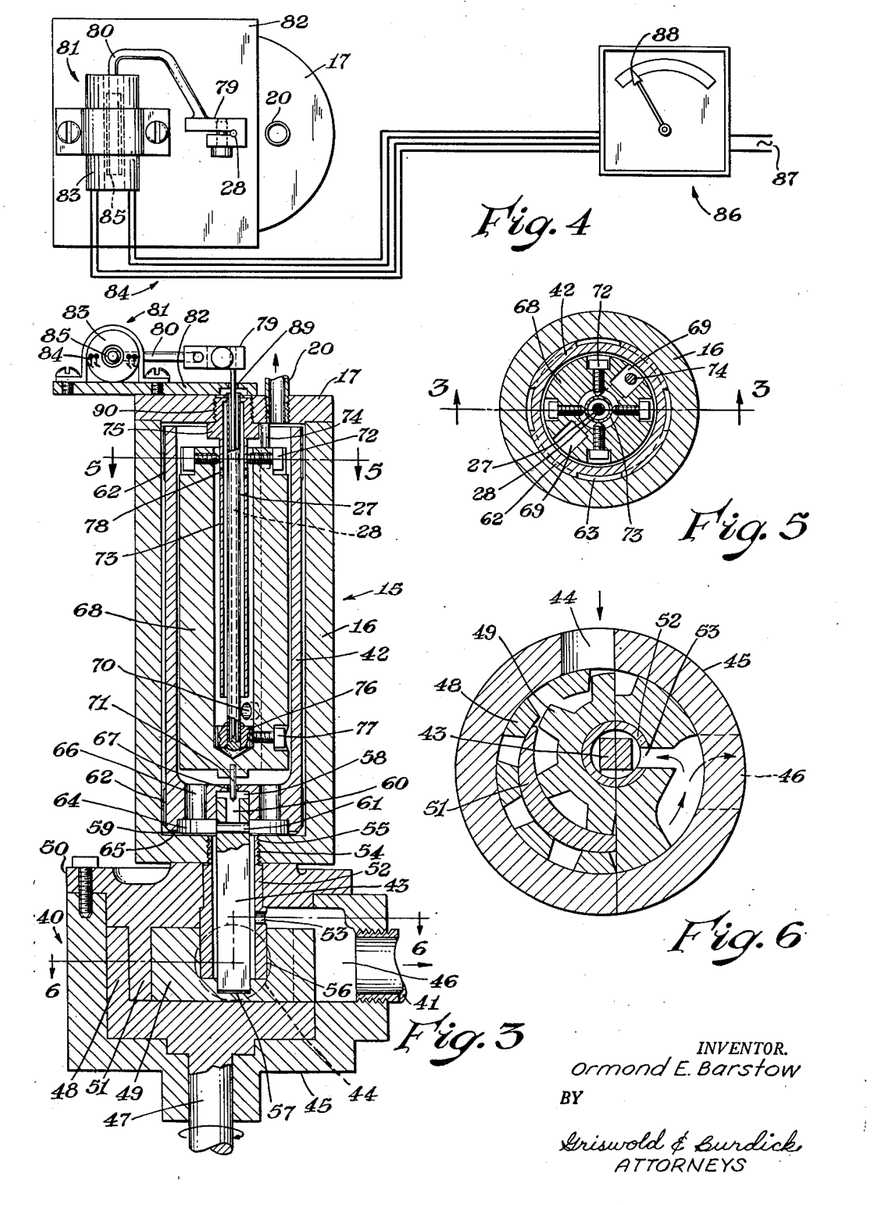
Fig. 3 is an elevational sectional view of a preferred embodiment of the new apparatus, along the line 3—3 in Fig. 5.
Fig. 4 is a plan view of the instrument of Fig. 3 with connected means for indicating the viscosity of the liquid.
Fig. 5 is a sectional view of the upper portion of the instrument of Fig. 3, along the line 5—5.
Fig. 6 is a section through the gear pump at the base of the instrument of Fig. 3, along lines 6—6.

The pump 40 illustrated in the drawings is an internal gear pump of known design. It is provided with an inlet port 44 in the rear of the pump housing 45 for receiving liquid to be pumped and a discharge port 46 in the side of the housing through which the liquid is forced into the pipeline 41. The pump 40 is operated by a power-transmitting shaft 47 entering the bottom of the housing 45 and connected to a constant-speed motor not shown. Mounted on the end of the pump shaft 47 to rotate in the pump housing 45 is a ring gear 48 which is one of two pumping elements. The other is a spur gear 49 having fewer teeth than the ring gear 48 and mounted eccentrically within the latter and engaging it around that part of its periphery nearest the discharge port 46. Depending from the cover 50 for the pump housing 45 and interposed in the clearance between the teeth of the gears 48 and 49 is a crescent-shaped abutment 51 which provides a seal between the inlet port 44 and discharge port 46 of the pump 40.

The flow of liquid from the pump 40 to the viscosimeter 15 takes place through a hollow cylindrical connector piece 52, the interior of which is open to the discharge port 46 of the pump through an orifice 53. The upper part of the connector piece 52 passes through the pump cover 50 into which it is press-fitted. Near its upper end, the connector piece 52 has external threads 54 which screw into a threaded hole 55 in the bottom center of the viscosimeter housing 16. The lower portion of the connector piece 52 extends downwardly well into the pump housing 45 and forms the bearing surface 56 around which the spur gear 49 rotates.

Turning freely within the connector piece 52 is the drive shaft 43 for the viscosimeter 15. As shown in Figs. 3 and 6, this shaft 43 is of square cross-section along its full length and has a somewhat smaller maximum cross-sectional dimension than the inside diameter of the connector piece 52. At its lower end, the shaft 43 fits into a square socket 57 in the lower part of the spur gear 49. At its upper end, the shaft 43 fits into a similar socket 58 in the bottom of the viscosimeter rotor 42. For lubrication purposes, the upper end of the shaft is provided with a counterbore 60 which terminates in a cross-bore 61 open to the liquid space at the bottom of the viscosimeter housing 16.

The viscosimeter rotor 42, as is evident from Figs. 3 and 5, is a hollow cylindrical steel cup which extends the full length of the viscosimeter housing 16 and is of diameter somewhat smaller than the housing. Two guide rings 62 formed on the outer surface of the rotor 42, one at each end, fit closely but slidably into the housing 16 to hold the rotor in axial alignment. These rings 62 are formed with four transverse grooves 63 in their peripheries. The bottom of the rotor 42 is counterbored slightly to provide a flow space 64 surrounded by an annular peripheral guide rim 65. Four radial grooves 59 in the base of the guide rim 65 connect with the transverse grooves 63 on the lower guide ring 62. These grooves allow a small flow of liquid to pass around the outside of the rotor 42 to the top of the housing 16. A plurality of openings 66 extend through the bottom of the rotor 42, placing the flow space 64 in communication with the inside of the rotor. There is also a small bearing hole 67 in the center of the rotor bottom extending into the shaft socket 58.

Mounted coaxially within the rotor 42 is a smaller diameter cylindrical stator 68 having a central bore, this stator being the torque-receiving element of the instrument. To improve liquid flow, the stator 68 is formed with two full-length longitudinal grooves 69 in the outer surface directly opposite one another (Fig. 5). Near its lower end, each groove 69 is open to the bore of the stator through a port 70. A needle bearing 71 projects downwardly from the bottom center of the stator 68 into the bearing hole 67 in the rotor 42, this arrangement serving to hold the lower end of the stator centered when the rotor is turning. At its upper end, the stator 68 is centered by means of four screws 72 which bear slidably on the torque tube sheath 73 later described. Excessive rotational movement of the stator 68 is prevented by a stop pin 74 (Fig. 5) fixed in the viscosimeter cover 17 and extending downwardly into one of the grooves 69.

The stator 68 is supported by a slender torque tube 27 having a length many times (e. g. forty times) its diameter. As shown in Fig. 3, the upper part of this torque tube 27 extends axially through a bushing 75 screwed into a threaded hole 90 in the center of the cover 17 and is secured rigidly to the bushing 75, as by welding at the outer end. At its lower end, the torque tube 27 is sealed or welded into a cylindrical knob 76 which fits slidably into the bore of the stator 68. A screw 77 through the wall of the stator 68 near the bottom fits loosely into a hole in the knob 76. The stator 68 is operatively connected thereby to the torque tube 27. Within the stator 68 and surrounding the torque tube 27 for all but the lower part of its length is a tubular protective sheath 73 formed as an integral extension of the bushing 75. To allow liquid flow inside it, this sheath 73 is provided with a number of vent holes 78 at the upper end.

Within the torque tube 27 and extending its full length is a rigid spindle 28 which transmits the rotary displacement of the stator 68 to the indicating elements. At their lower ends, the spindle 28 and torque tube 27 are welded into the knob 76 and are thus sealed therein and integral therewith. The other end of the spindle 28 which is free to turn relative to the torque tube 27, projects beyond the upper end of the latter and passes through a bearing aperture 89 in a mounting plate 82 attached to the viscosimeter cover 17. Screwed firmly to this projecting spindle 28 is a clamp 79 to which is attached a radially-extending spindle arm 80. If desired, this arm 80 may be provided with mechanical amplifying means and a pointer to read against a scale, as in the simplified instrument of Fig. 1. Preferably, however, as shown in Figs. 3 and 4, the instrument is constructed to allow telemetering. To this end, a conventional linear differential transformer 81 is screwed to the mounting plate 82 secured to the viscosimeter cover 17. This transformer consists of a hollow coil 83, i. e. a primary coil surrounded at each end with one of the two parts of a split secondary coil connected in opposition, the whole being provided with lead wires 84, and a core 85 which may be moved through the center of the hollow coil 83. The core 85 is mounted on the end of the spindle arm 80. The lead wires 84 are connected to a conventional cooperating indicating instrument 86, the whole assembly deriving energy from an alternating current source 87. As will be appreciated, changes in angular position of the spindle arm 80 cause the core 85 to shift its position within the coil 83. This resulting relatively small motion of the core causes a change in the output voltage of the transformer which is transmitted to the indicating instrument 86, where it alters the position of the pointer 88. When desired, the instrument 86 may be made recording.

The viscosimeter of Figs. 3 to 6 operates only when the pump 40 is operating. Some of the liquid discharged by the pump continuously passes upward through the orifice 53 and connector piece 52 into the bottom of the viscosimeter 15. From there it passes upwardly and out through the outlet conduit 20 in the cover. Because of the numerous ports and grooves in the rotor, stator, and protective sheath, there are no stagnant regions, the liquid moving continuously both outside and inside of each of these elements. Since the metal forming the rotor and stator nearly fills the viscosimeter housing 16, the liquid inventory is small. The entering liquid thus proceeds rapidly through the instrument which accordingly gives, without significant lag, indications representative of the viscosity of the liquid being pumped.

In practice, the pump 40 is driven by a constant-speed motor, not shown. As the pump shaft 47 turns, the driven spur gear 49 causes the viscosimeter drive shaft 43 to rotate. This latter causes the rotor 42 to turn at constant speed, imparting a shearing motion to the liquid in the viscosimeter between the rotor and the stator 68. This shearing motion produces a torque on the stator 68, which turns slightly on its axis and engages the torque tube 27 through the screw 77 in the knob 76. As the stator 68 turns, it is restricted by the torque tube 27 which twists and acts as a spring, the twist in the torque tube being proportional to the applied torque. The angular motion of the lower end of the torque tube 27 produces a corresponding angular displacement of the spindle 28 and of its attached arm 80. This displacement alters the position of the transformer core 85, causing the instrument pointer 88 to move. In a typical design of the viscosimeter 15, the distance from the axis of the spindle 28 to the axis of the transformer core 85 is 2 inches. Thus, when the spindle moves 2.87 degrees, the transformer core 85 moves 0.1 inch in the coil 83 and causes full scale deflection of the pointer 88 of the viscosity indicating instrument 86.

The angular displacement of the stator 68, as shown by the pointer 88, is a function of the speed of rotation of the rotor 42 and the viscosity of the liquid. By controlling the rotor speed, the reading of the instrument 86 will be a direct indication of the viscosity of the liquid. By suitable calibration, the instrument 86 may be made to read in conventional viscosity units.

There are many possible alternative systems which may be employed in conjunction with the improved viscosity measuring instrument as shown to indicate and record as well as amplify the rotation of the torque tube spindle. These may involve mechanical, optical, and electrical devices such as used in thickness gauges, pressure gauges, and a wide variety of instruments. Furthermore, it is a relatively simple matter to couple such systems for indicating or recording viscosity to a conventional control system of a mechanical, electrical, pneumatic, or hydraulic type which can actuate valves, pumps, heaters, or other control means in processing vessels and lines to maintain the viscosity of a liquid at a chosen value.

Figure 7:
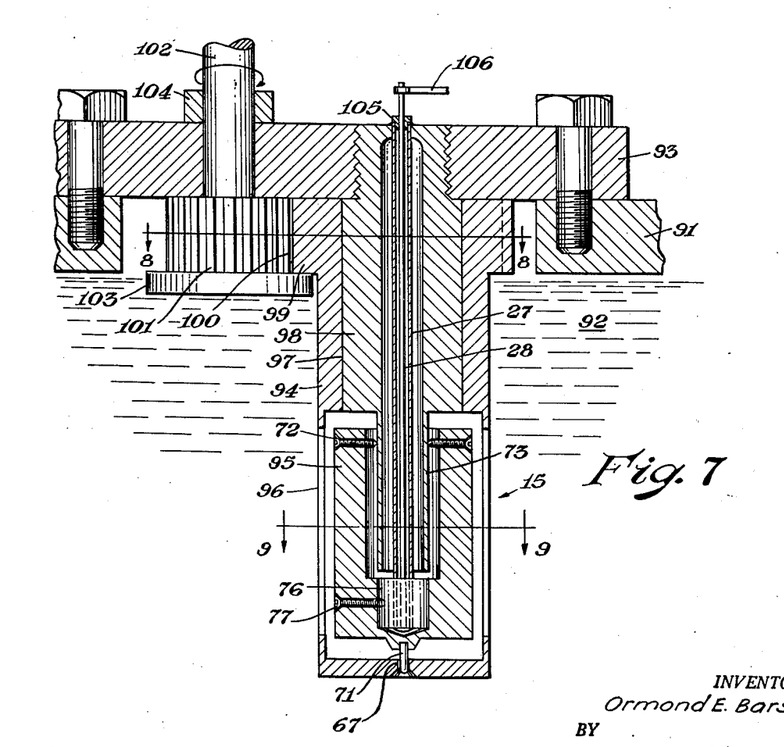
Fig. 7 is a fragmentary elevational view mostly in section, of another modification of the invention, illustrated as being mounted within a closed vessel containing the test liquid.
Figure 8:
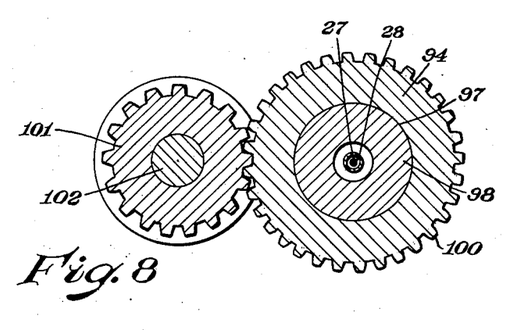
Fig. 8 is a transverse sectional view of the viscosimeter of Fig. 7 along the line 8—8.
Figure 9:
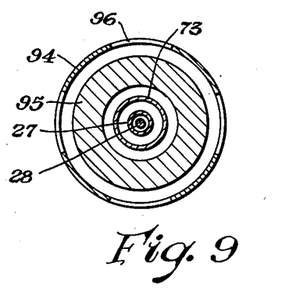
Fig. 9 is another transverse sectional view of the viscosimeter of Fig. 7 along the line 9—9.

In Figs. 7 to 9, there is shown, somewhat fragmentarily, another form of the viscosimeter of the invention. This form is particularly suited for measuring the viscosity of liquids in process vessels, such as tanks, and may be mounted on the top, side, or bottom thereof. As illustrated, the viscosimeter 15 is fastened to the cover 91 of a tank containing a liquid 92. The viscosimeter 15 has no housing, but simply is mounted on a plate 93 covering a hole in the tank cover 91. Through this, the viscosimeter 15 projects to a depth such that the rotor 94 and stator 95 are immersed in the liquid 92. At its lower end, the rotor 94 consists of a thin-walled hollow cylinder in the side of which, for the length opposite the stator 95, are cut vertical elongated slots 96 to allow free passage of the liquid. At its upper end, the walls of the rotor 94 are thickened, leaving a carefully machined bore which acts as a moving bearing surface. This bore fits closely over a corresponding stationary bearing surface 97 on the outer surface of a hollow bearing piece 98 which is threaded into the plate 93. Also at the upper end, the rotor 94 is provided with a rim 99 having peripheral gear teeth 100 which engage those of a pinion gear 101 fastened to a power-transmitting shaft 102 extending downwardly through the cover plate 93. The pinion gear 101 has an enlarged annular shoulder 103 on its lower side, to keep the rotor 94 from slipping downward. The shaft 102 is held up by a collar 104 on top of the cover plate 93 and is rotated at a constant speed by a motor not shown. To prevent leakage around the shaft 102, a stuffing box or other rotary seal (not shown) may be employed.

Mounted within the rotor 94 is a stator 95 which is closely similar to that of the instrument of Figs. 3 to 6 except that it has no external grooves. The stator 95 is operatively connected to a torque tube 27 which extends upwardly through the center of the bearing piece 98 to a point above the plate 93. A tubular extension of the bearing piece 98 forms a protective sheath 73 for the torque tube 27. A spindle 28 within the torque tube 27 is welded to the torque tube 27 at its lower end. The torque tube, in turn, is rigidly secured to the stator 95. At its upper end, the spindle 28 extends outside the vessel through a guide bearing 105 and carries a pointer arm 106 or other indicating or angular position-transmitting means.

In operation, the shaft 102 is rotated, turning the pinion gear 101 and the rotor 94. Due to the rotation of the latter, the liquid 92 between the rotor 94 and stator 95 is set in motion. This produces a viscous drag on the stator 95 by fluid friction. The stator 95 rotates slightly, twisting the torque tube 27 and causing the spindle 28 to turn, thereby producing an indication of the viscosity of the liquid 92.

Figures 10, 11, 12:
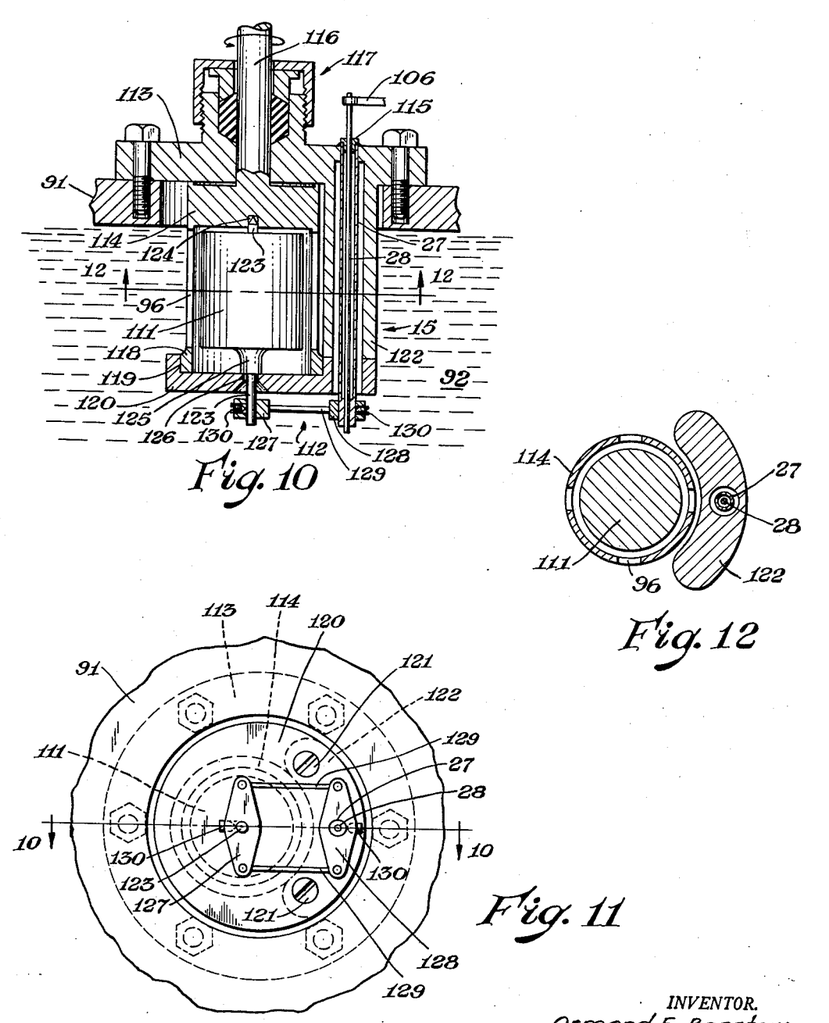
Fig. 10 is an elevational sectional view of another modification of a tank-mounted viscosimeter in which the torque tube is not coaxial with the stator.
Fig. 11 is a bottom view of the viscosimeter of Fig. 10 showing the mechanical linkage connecting the stator with the torque tube and spindle.
Fig. 12 is a transverse sectional view of the viscosimeter of Fig. 10 along the line 12—12.

Figs. 10 to 12 illustrate another type of viscosimeter in accordance with the invention for mounting in a tank. The construction shown differs from that already explained in that in this instance the torque tube 27 is not coaxial with the stator 111 but is mounted to one side and connected thereto by mechanical linkage 112.

As shown, the viscosimeter 15 is mounted on a plate 113 covering an opening in the cover 91 of a tank maintained vertically full of liquid. The rotor 114, which is immersed in the liquid 92 is a hollow cylinder or inverted cup open at the lower end and provided with vertical elongated slots 96 opposite the stator 111. At its upper or closed end, the rotor 114 is integral with a power-transmitting shaft 116 which extends upwardly through a stuffing box 117 on the cover plate 113, and is driven by a suitable motor not shown. At the lower open end of the rotor 114, the wall is thickened to provide a bearing rim 118 which slides in a stationary annular bearing recess 119 in a horizontal support plate 120. This plate is removably secured by screws 121 (Fig. 11) to a crescent-shaped vertical hollow support column 122 which is integral with the cover plate 113.

Within the rotor 114, the stator 111 is in the form of a solid cylinder mounted on an axle 123 which projects from each end. At the upper end, the axle 123 is socketed in a recess 124 in the center of the closed end of the rotor 114. At the other end, the axle 123 is thickened to provide a hub 125 which rests on the support plate 120. A further extension of the axle 123 projects through a central opening 126 in the support plate 120, and a cross-arm 127 is rigidly attached to the projection by a set screw 130. A similar cross-arm 128 is secured to the lower end of a torque tube 27 by another set screw 130. The two crossarms are connected by links 129 pivoted on each. The torque tube 27 extends upwardly through the hollow portion of the support column 122 and through the coverplate 113, being welded to the latter on the upper side. A spindle 28, fixedly sealed to the torque tube 27 at the lower end, projects upwardly through a guide bearing 115 outside the vessel beyond the open end of the torque tube. A pointer arm 106 or other suitable angular position-transmitting means is attached to the free end of the spindle 28, and may be read against a scale (not shown).

In operation, the shaft 116 is turned at constant speed, causing the rotor 114 to turn in the liquid 92. The torque produced on the stator 111 turns it slightly on its axle 123. The mechanical linkage 112 consisting of crossarms 127 and 128 together with the links 129 impose this torque on the torque tube 27. The degree of angular displacement of the latter is indicated by the angular movement of the free end of the spindle 28.

It will be appreciated that the instrument of Figs. 10 to 12 will operate almost equally well upside down or on its side. It may therefore be mounted projecting upwardly through the bottom of a tank, or through a side, as well as through the top, as shown.

Figure 13:
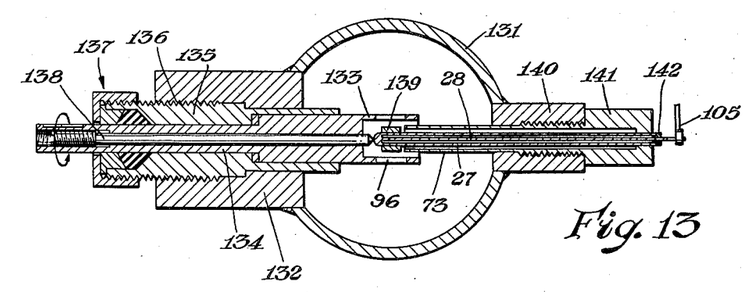
Fig. 13 is a sectional view of another embodiment of the invention, mounted in a conduit through which flows the liquid to be tested.

In Fig. 13, there is shown an embodiment of the invention somewhat smaller than those heretofore explained. It is designed particularly for interposing in a pipeline at any point to measure the viscosity of the liquid flowing through it. The instrument is mounted cross-wise in a length of the pipe 131, which appears in cross-section, the liquid flowing perpendicular to the plane of the drawing.

The rotor assembly is supported in a hollow mounting block 132 welded into one side of the pipe 131. At its inner end, the rotor 133 is cup-shaped and has longitudinal slots 96 opposite the stator. At its other end, the rotor 133 is formed into a power-transmitting shaft 134 provided with a small central bore extending full length. The rotor 133 is free to turn within a stepped sleeve bearing 135 which is screwed into a socket 136 in the mounting block 132. A stuffing box 137 or rotary seal at the end of the sleeve bearing 135 prevents leakage around the rotor shaft 134. The rotor 133 is driven by a suitable motor (not shown) through the rotor shaft 134. A needle bearing 138 threaded into the bore of the rotor shaft 134 extends into the cup of the rotor 133 to steady the end of the stator 139.

The stator assembly is supported in a second hollow mounting block 140 welded into the pipe 131 opposite the rotor assembly. The stator 139 is a small cylinder positioned within the cup of the rotor 133 and rigidly sealed to both the torque tube 27 and torque tube spindle 28. At the outer end, the torque tube 27 projects through and is welded to a hollow bushing 141 which is screwed into the mounting block 140. A tubular extension of the bushing 141 forms a protective sheath 73 for the torque tube 27. The free end of the spindle 28 extends outwardly through a guide bearing 142 at the outer end of the torque tube 27 and carries a pointer arm 105 or other indicating mechanism. Operation of the device is the same as for those already explained. This embodiment is particularly effective for use with high viscosity fluids, such as molten resinous polymers.

Figure 14:
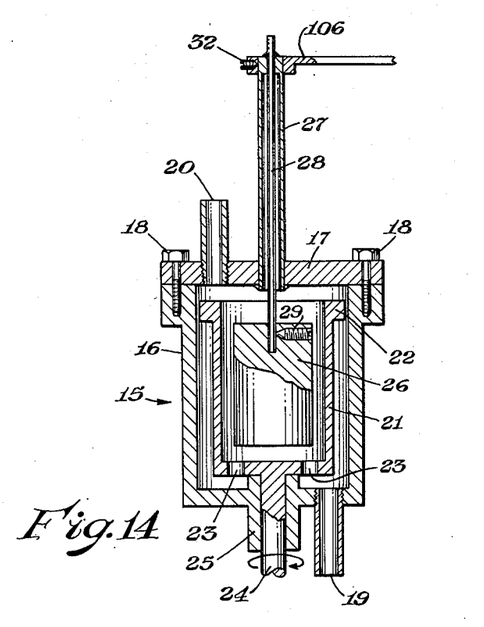
Fig. 14 is an elevational sectional view of a modification of the viscosimeter of Fig. 1.

Fig. 14 shows a modification of the viscosimeter of Fig. 1 in which the torque tube 27 extends outside the viscosimeter housing 16 and is operatively connected through the spindle 28 to the stator 26 centered within the rotor 21.

In the viscosimeter 15 as shown, the torque tube 27 projects through the center of the housing cover 17 and is welded to the inner surface thereof in a liquid-tight seal around its lower end. A rigid torque tube spindle 28, immovably socketed in the top center of the stator 26, passes upwardly through the center of the torque tube 27 and extends a short distance beyond the end thereof. This spindle 28 is welded to the upper end of the torque tube 27 in fluid tight relation thereto. At its upper end, the torque tube 27 carries a pointer arm 106 or other indicating means. If desired, the pointer arm 106 may be attached to the end of the spindle 28 which projects beyond the torque tube 27.

In operating the viscosimeter 15 of Fig. 14, liquid is passed therethrough and the rotor 21 is revolved in a manner similar to that described for Fig. 1 thereby imparting torque to the stator 26 and producing an indication on the pointer arm 106.

Many variations within the scope of the invention may be employed in the arrangement and design of the improved viscosity-measuring apparatus. For example, the stator may be rigidly or non-rigidly attached to either the torque tube or the spindle. Either direct connections or intermediate linking or coupling members may be employed. Furthermore, a cylindrical rotor may be mounted inside a hollow cylindrical stator rather than mounting the stator within the rotor. The latter arrangement of stator in rotor is usually preferred, however, to shield the stator from any movement in the liquid other than that set in motion by the rotor. This is especially true for viscosimeters mounted in liquids in a state of turbulence, e. g. due to mixing or to rapid flow through a pipe. Instead of employing cylindrical rotors and stators in the viscometric instruments of the invention, nested cone-shaped or even disc-shaped members may be used with the attendant advantage that the spacing between the surfaces of such members can be easily adjusted by moving one member along its axis of rotation. Viscometric instruments so designed are very versatile and can be employed to measure viscosities over an extremely wide range of values. Obviously, the driving mechanism is not a critical part of the design of the viscometric apparatus of the invention. The rotor of the viscosimeter may be driven by a suitable power-transmitting shaft which enters the tank or surrounding housing from almost any direction, i. e., from the top, side, or bottom thereof. Either a constant or variable speed motor may be employed to drive the viscosimeter and is usually selected to suit not only the intended use, e. g. the type of viscosity measurements desired, whether they be experimental determinations or process control, but also the range in viscosity of the one or more liquids to be encountered.

In the viscosimeters of the invention, the spindle may be rigidly attached to the torque tube at some distance from the stator. It is apparent that the magnitude of deflection of the spindle is directly proportional to the distance between the place of such attachment and the place at which the torque tube is fixedly mounted, e. g. to the housing. This distance may sometimes be sufficient for good sensitivity even when the spindle and torque tube are connected together remote from the stator, e. g. when the stator is anchored to the torque tube and the spindle attached to the latter remote from the stator, or when the spindle extends into the liquid beyond its connection to the torque tube and is secured to the stator remote therefrom. Other factors remaining constant however, greater sensitivity may usually be obtained when the torque tube and spindle are connected in close proximity to the stator as in the preferred embodiments shown in the drawings.

The viscosimeters of the invention can be built very rugged, and can be made operable over a wide range of viscosities from that of thin liquids like light lubricating oils to exeremely viscous semi-solids such as paints and molten synthetic resins. They also have the unique advantage that they can be mounted to extend through the walls of process piping and vessels into the liquids therein, even when the vessels are under considerable pressure. Because of the fact that the torque tube spindle is sealed within the torque tube, there is no leakage of a pressure vessel through the viscosimeter. Packing glands are entirely eliminated from the sensitive stator, torque tube, spindle, and measuring elements; these latter remain entirely free to operate and give their indications without mechanical hindrance. In addition, the torque tube remains stationary and is not subjected to any mechanical stresses other than those imposed by fluid friction. For these reasons, by selecting a torque tube of known torque-twist characteristics, the instrument can be made with a calibration which is linear and which can be computed mathematically. Measurements of viscosity may be continuous. The indicating elements may be any of the conventional types used for measuring displacements of a movable element, and may be made recording and controlling when desired.

The viscosimeters of the invention which have a cylindrical stator mounted within a hollow cylindrical rotor may be designed with a certain predetermined viscosity range by applying the following rheological equation:

$$T = \frac{4\pi h \omega s}{1/a^2 - 1/b^2} n$$

wherein:

$T$=torque applied to the stator for full scale reading in dyne-centimeters
$h$=length of stator in centimeters
$n$=viscosity for full scale reading in poises
$\omega$=angular velocity of rotor in radians per second
$a$=radius of stator in centimeters
$b$=radius of rotor in centimeters
$s$="slot factor" which corrects for the reduced cylindrical surface area of the stator as a result of the longitudinal slots sometimes used on the stator and represents the fraction of the original area still present after cutting the slots (e. g. with no slots, this slot factor is 1.0 while with 10% of the cylindrical area cut away this factor is 0.9)

Since the above equation does not take into account "end-effects" at the ends of the stator and since the "slot-factor" correction is only approximate, the absolute accuracy of the calibration computed from the above expression may be in error by as much as 10%. If greater absolute accuracy of calibration is required, this may be had by comparing the viscosity readings of the viscosimeter for a particular liquid with viscosities of the liquid determined by more accurate means if such data is available.

In using the above equation to design a viscosity meter similar to that illustrated in Figs. 3 to 6 which is capable of determining the viscosities of liquids in the range of zero to 10,000 centipoises, the following specifications may be employed:

$T$=1,338,000 dyne-centimeters for full scale. This torque twists the stainless steel torque tube thru an angle of .0500 radian and moves the differential transformer core mounted on a 2 inch long spindle arm, a distance of 0.100 inch in the transformer coil, thereby causing the recorder pen to move full scale
$h$=13.73 centimeters, equivalent to 5.406 inches
$\omega$=4.115 radians per second, equivalent to 39.2 revolutions per minute
$b$=2.54 centimeters, equivalent to 1.00 inch
$a$=2.225 centimeters, equivalent to 0.876 inch
$s$=0.88

Likewise, when the foregoing equation is employed to design a viscosimeter similar to that shown in Fig. 13 for recording the viscosities of molten plastics in the relatively high range of zero to 10,000,000 centipoises, i. e. 100,000 poises, the following specifications are satisfactory:

$T$=1,338,000 dyne-centimeters
$h$=0.952 centimeter, equivalent to 0.375 inch
$\omega$=1.36 radians per second, equivalent to 13.0 revolutions per minute
$b$=0.889 centimeter, equivalent to 0.350 inch
$a$=0.635 centimeter, equivalent to 0.250 inch
$s$=1.00, there being no slots in the stator When the clearance between the rotor and stator is small compared to the radii of the rotor and stator, the above equation may be simplified to the following approximate expression:

$$T \cong \frac{2\pi r^3 h \omega s}{b - a} n$$

wherein $r$=the mean radius of the rotor and stator in centimeters.

If it were desirable to design a viscosimeter with a relatively low viscosity range, the above equation shows that the logical thing to do is to use a weak torque tube which would give a small value for $T$. It would be desirable to use a relatively long stator of large diameter, a small clearance ($b-a$) between rotor and stator, and a relatively high rate of rotation $\omega$. The use of a long spindle arm for the differential transformer core and a sensitive recorder which would travel full scale for a minimum displacement of the core would also help to give a low value for $T$ in the above expression.

In rheological measurements on certain types of materials, for example those exhibiting thixotropic properties, it may be desirable to make the viscosity measurements at known and specified rates of shear in the liquid. Such specifications must be taken into account in the design of the viscosimeter. Rates of shear in a viscosimeter of the type herein described having concentric cylindrical stator and rotor can be readily calculated from the radii of the stator and rotor and the angular velocity of the latter.

Although the above-described viscometric instruments are particularly suitable for continuously measuring and indicating or recording the viscosity of a stream of liquid being passed through them, it is quite possible to use this type of instrument in other ways. For example, these instruments could be used to measure the viscosity of a given small sample of liquid placed therein or perhaps to measure viscosity as a function of time or as a function of the total amount of mechanical work computed to be put into the liquid by the shearing forces present in the viscosimeter. In the latter case, the rotor of the viscosimeter could be in the form of a vertical open cup into which could be poured a sample of the liquid to be measured instead of immersing the rotor in the liquid.

That which is claimed is:

1. Apparatus for determining the viscosity of a liquid comprising: an elongated cylindrical housing having inlet and outlet ports for passage of the liquid therethrough; an elongated cup-like rotor mounted in the housing for rotation in the liquid; a power-transmitting shaft for driving the rotor; a cylindrical stator coaxially mounted within the rotor to receive torque imparted to it by the viscous drag of the liquid between the rotor and the stator; a torque tube extending into the housing in coaxial alignment with the rotor and stator, said torque tube having one end sealed immovably to the housing and the other end operatively connected to the stator to resist torque applied thereto; a rigid spindle in the torque tube having one end connected to turn in response to torsional displacement of the stator and sealed in fluid-tight relation to the torque tube near its inner end, the other end of said spindle extending freely outside the housing beyond the other end of the torque tube; and means actuated by the free end of the spindle to indicate torsional displacement of the stator.

2. An apparatus for determining the viscosity of a liquid comprising: an elongated housing containing inlet and outlet ports for passing liquid in and out of the housing; liquid displacement mechanism for pumping liquid through the housing; a power-transmitting shaft for driving the liquid displacement mechanism; a drive shaft operatively connected thereto; an elongated cup-like rotor mounted within the housing on the drive shaft for rotation in the liquid; a cylindrical stator coaxially mounted within the rotor to receive torque imparted to it by the viscous drag of the liquid between the rotor and the stator; a torque tube extending into the housing in coaxial alignment with the rotor and stator, said torque tube having one end sealed immovably to the housing and the other end operatively connected to the stator to resist torque applied thereto; a rigid spindle in the torque tube having one end connected to turn in response to torsional displacement of the stator and sealed to the torque tube near its inner end, the other end of said spindle extending freely outside the housing beyond the other end of the torque tube; a spindle arm attached to the torque tube spindle; a differential transformer core mounted on the free end of the spindle arm; a differential transformer coil mounted concentrically about the transformer core and spaced apart therefrom to allow displacement of the transformer core within the coil; and electrical means connected to the differential transformer and actuated in response thereto to indicate movement of the transformer core.

3. Apparatus for determining the viscosity of a liquid in a vessel comprising: a power-transmitting shaft passing into the vessel and rotatably mounted in the wall thereof; a pinion gear mounted on said shaft within the vessel; a hollow cylindrical bearing rigidly mounted on the inside surface of the vessel nearby the pinion gear; an elongated hollow cylindrical rotor mounted on the bearing for rotation in the liquid, said rotor having around its outer surface near the vessel wall, a rim with teeth thereon which mesh with the teeth of the pinion gear so as to turn the rotor as the pinion gear is rotated, the other end of the rotor having a plurality of openings in its wall through which liquid may pass in and out of the rotor as it revolves; a cylindrical stator coaxially mounted within the rotor to receive torque imparted to it by the viscous drag of the liquid between the rotor and the stator; a torque tube extending into the vessel and passing through the hollow cylindrical bearing in coaxial alignment with the rotor and stator, having one end sealed immovably to the wall of the vessel and the other end operatively connected to the stator to resist torque applied thereto; a rigid spindle extending into the torque tube being connected and sealed to the torque tube near its inner end and connected to turn in response to torsional displacement of the stator, the other end of the spindle extending freely outside the vessel beyond the other end of the torque tube; and means actuated by the free end of the spindle to indicate torsional displacement of the stator.

4. Apparatus for determining the viscosity of a liquid in a vessel comprising: a power-transmitting shaft passing into the vessel and rotatably mounted in the wall thereof; a hollow cylindrical rotor mounted on said shaft adjacent to the wall of the vessel for rotation in the liquid, said rotor having a plurality of openings in its wall through which liquid may pass in and out of the rotor as it revolves; a cylindrical stator coaxially mounted within the rotor to receive torque imparted to it by the viscous drag of the liquid between the rotor and the stator; a torque tube extending into the vessel and having one end sealed immovably to the wall of the vessel; a rigid torque tube spindle projecting into the torque tube and sealed thereto near its inner end; means for operatively connecting the inner end of the torque tube to the stator to turn in response to torsional displacement thereof; and means actuated by the free end of the torque tube spindle to indicate torsional displacement of the stator.

5. Apparatus for determining the viscosity of a liquid in a conduit comprising: a power-transmitting shaft passing into the conduit and rotatably mounted in the wall thereof; an elongated cylindrical rotor mounted on said shaft for rotation in the liquid, said rotor being cup-shaped at one end and having a plurality of openings in its wall around the cup-shaped portion thereof through which liquid may pass in and out of the rotor as it revolves; a cylindrical stator coaxially mounted within the cup-shaped portion of the rotor to receive torque imparted to the liquid by the rotor; a torque tube extending into the conduit in coaxial alignment with the rotor and stator, said torque tube having one end sealed immovably in the wall of the conduit oppositely disposed from the open end of the rotor and the other end operatively connected to the stator to receive torque therefrom; a rigid spindle in the torque tube having one end connected to turn in response to torsional displacement of the stator and sealed to the torque tube near its inner end, the other end of said spindle extending freely outside the conduit beyond the other end of the torque tube; and means actuated by the free end of the spindle to indicate torsional displacement of the stator.

6. Apparatus for determining the viscosity of a liquid in a closed liquid container comprising a rotor mounted for rotation in the liquid; means for driving the rotor; a stator positioned to receive torque imparted to it by the viscous drag of the liquid between the rotor and the stator; a torque tube sealed immovably at one end to the wall of the liquid-container in fluid-tight relation thereto, the other end of the torque tube being sealed in a fluid-tight seal and operatively connected to the stator to receive torque therefrom; a rigid spindle in the torque tube being operatively connected at one end to turn in response to angular displacement of the stator, the other end of said spindle extending outside the fluid container beyond the end of the torque tube; and means actuated by the spindle to indicate angular displacement of the stator.

7. Apparatus for determining the viscosity of a liquid in a closed liquid container comprising: a cylindrical rotor mounted for rotation in the liquid; means for driving the rotor; a cylindrical stator positioned to receive torque imparted to it by the viscous drag of the liquid between the rotor and the stator, said stator and rotor being coaxially mounted one within the other; a torque tube extending into the liquid container immovably sealed at one end by its outer wall to the wall of the liquid container in fluid-tight relation thereto, the other end of the torque tube being sealed in a fluid-tight seal and operatively connected to the stator to receive torque therefrom; a rigid spindle in the torque tube, one end of said spindle being operatively connected near the inner end of the torque tube to turn in response to angular displacement of the stator, the other end of said spindle extending freely outside the liquid container beyond the other end of the torque tube; and means actuated by the free end of the spindle to indicate angular displacement of the stator.

8. Apparatus for determining the viscosity of a liquid in a closed liquid container comprising: a hollow cylindrical rotor mounted for rotation in the liquid; means for driving the rotor; a cylindrical stator coaxially mounted within the rotor to receive torque imparted to it by the viscous drag of the liquid between the rotor and the stator; a torque tube extending into the liquid container and sealed at one end by its outer wall to the wall of the liquid container in fluid-tight relation thereto, the other end of the torque tube being sealed in a fluid-tight seal and operatively connected to the stator to receive torque therefrom; a rigid spindle in the torque tube, one end of said spindle being operatively connected near the inner end of the torque tube to turn in response to angular displacement of the stator, the other end of said spindle extending freely outside the liquid container beyond the other end of the torque tube; and means actuated by the free end of the spindle to indicate angular displacement of the stator.

9. Apparatus for determining the viscosity of a liquid in a closed liquid container comprising: a rotor mounted for rotation in the liquid; means for driving the rotor; a stator positioned to receive torque imparted to it by the viscous drag of the liquid between the rotor and the stator; a torque tube extending into the liquid container in coaxial alignment with said rotor and stator and sealed immovably at one end by its outer wall to the wall of the liquid container in fluid-tight relation thereto, the other end of the torque tube being sealed in a fluid-tight seal and operatively connected to the stator to receive torque therefrom; a rigid spindle in the torque tube, one end of said spindle being operatively connected near the inner end of the torque tube to turn in response to angular displacement of the stator, the other end of said spindle extending freely outside the liquid container beyond the other end of the torque tube; and means actuated by the free end of the spindle to indicate angular displacement of the stator.

10. Apparatus for determining the viscosity of a liquid in a closed liquid container comprising: a power-transmitting shaft passing into the liquid container and rotatably mounted on the wall thereof; a hollow cylindrical rotor open at one end and mounted at the other end on the power-transmitting shaft for rotation in the liquid, said rotor having a plurality of openings in its wall through which liquid may pass in and out of the rotor as it revolves; a cylindrical stator coaxially mounted within the hollow cylindrical rotor to receive torque imparted to the liquid by the rotor; a torque tube extending into the liquid container in coaxial alignment with the rotor and stator, said torque tube being immovably sealed at one end in a fluid-tight seal to that wall of the liquid container which is oppositely disposed from the open end of the rotor, the other end of said torque tube being sealed to withstand entry of the liquid into the torque tube and operatively connected to the stator to receive torque therefrom; a rigid spindle in the torque tube, one end of said spindle being operatively connected near the inner end of the torque tube to turn in response to angular displacement of the stator, the other end of said spindle extending freely outside the liquid container beyond the other end of the torque tube; and means actuated by the free end of the spindle to indicate angular displacement of the stator.

References Cited in the file of this patent

UNITED STATES PATENTS

| | | |
|---|---|---|
| 1,827,560 | Binckley | Oct. 13, 1931 |
| 1,836,995 | Stickney | Dec. 15, 1931 |
| 2,096,222 | Bock | Oct. 19, 1937 |
| 2,457,247 | Lawshe | Dec. 28, 1948 |
| 2,519,378 | Kilpatrick | Aug. 22, 1950 |

FOREIGN PATENTS

| | | |
|---|---|---|
| 847,076 | Germany | Aug. 21, 1952 |
| 478,537 | Italy | Feb. 24, 1953 |